July 12, 1960 R. E. SWANSON 2,944,856
SAFETY VALVE FOR AUTOMOTIVE AIR BRAKE SYSTEMS
Filed Jan. 26, 1956 3 Sheets-Sheet 3
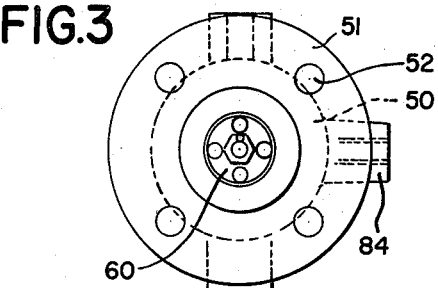
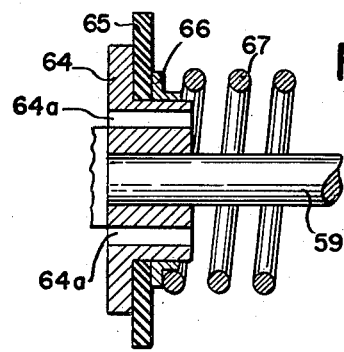
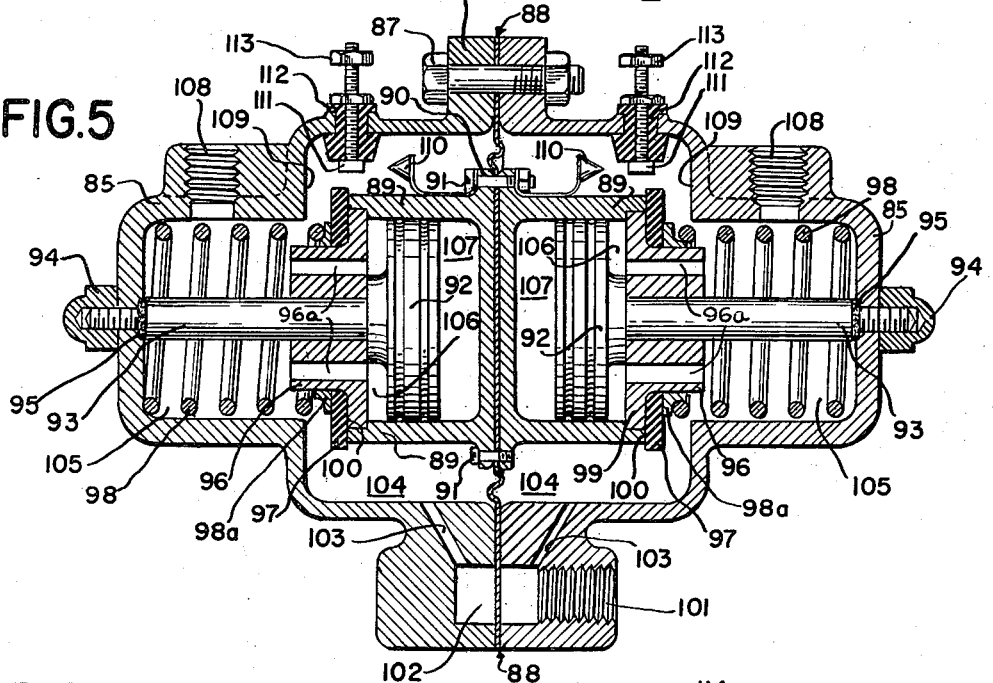
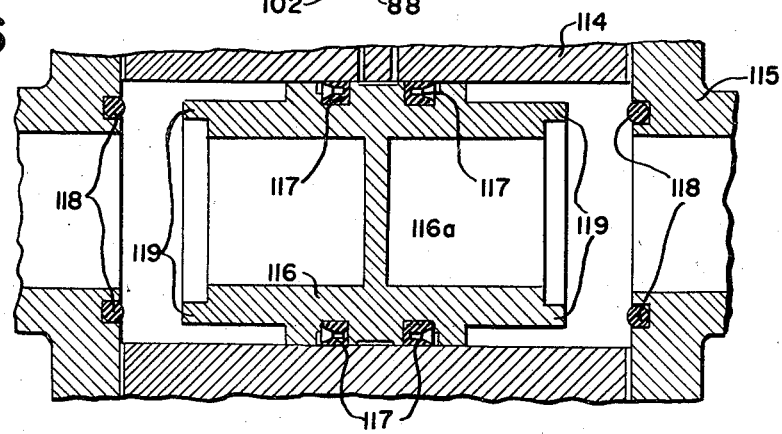

United States Patent Office 2,944,856
Patented July 12, 1960

2,944,856
SAFETY VALVE FOR AUTOMOTIVE AIR BRAKE SYSTEMS

Robert E. Swanson, Vancouver, British Columbia, Canada, assignor to Railway Appliance Research Limited, Vancouver, British Columbia, Canada, a corporation of British Columbia Filed Jan. 26, 1956, Ser. No. 561,623

14 Claims. (Cl. 303—84)

This invention relates to air brake systems of the type applied to motor vehicles such as transport trucks, tractor and trailer combinations, buses and the like, and is concerned particularly with the provision of means for maintaining the operative condition of a portion of the system when a break in the air transmission lines occurs at some point.

Air brake systems as commonly installed on automotive vehicles include a small air compressor arranged to build up a supply of compressed air in a small reservoir from which the air may be supplied under valve control to brake chambers at a plurality of wheels to operate brake shoes or bands associated with brake drums carried by the wheels. The brake chambers are pressure responsive devices and are usually provided with diaphragms arranged to be flexed upon the introduction of air under pressure into the chambers. They are mounted on the axles of the vehicle adjacent the wheels. Due to the fact that springs are provided between the chassis of the vehicle and the axles, it becomes necessary to use flexible hoses to connect the air supply with the brake chambers. These hoses often rupture under the pressure of the air due to deterioration of the hoses. At times the diaphragms in the brake chambers also rupture. On dirt roads, such as logging roads, the brake chambers and hoses are vulnerable to stones thrown up by the tires and as a result the hoses are frequently knocked off so that when an attempt is made to apply the brakes all of the air in the system required for the purpose is dissipated into the atmosphere and it is impossible to build up sufficient pressure in the lines which remain intact to operate the associated brakes. All of the brakes on the vehicle are thus rendered inoperative with the result that a serious accident is likely.

One of the objects of the present invention has been to overcome the foregoing difficulty by incorporating in the brake system means, which becomes effective when a dangerous leak occurs in any brake chamber or the air transmission line thereto, which will shut off the delivery of air to the affected chamber whenever the driver operates the brake pedal. At the same time the air supply to the other brake chambers, or certain of them, will remain unaffected so that the brake operating devices for the associated wheels will continue to be operative under the control of the driver of the vehicle.

Another object of the invention has been to provide a warning device, either audible or visible, to warn the driver whenever an emergency condition of the character indicated exists on the vehicle. This will cause the operator to use with caution that part of the braking system which is still operative until the system may be repaired.

A further object of the invention has been to incorporate protective means, of the character mentioned above, on a tractor and trailer combination in such a manner that if a break in one of the air transmission lines should occur on the trailer, some of the brakes on the trailer and all of the brakes on the tractor will still remain operative and under the control of the driver so that the vehicle may be brought to a safe stop. Moreover, the improved system is such that if the trailer should break away from the tractor and thus bring about rupturing of the hose lines connecting the tractor with the trailer, the brakes on the trailer will be automatically operated to stop the same while the brakes on the tractor will still remain operative and under the full control of the driver.

An important feature of the invention is the provision of a protective valve of the character mentioned which is of special construction. It is of such form that it operates on a pressure differential between two ends or sides of the unit, the arrangement being such that when a sufficient pressure differential is created the force necessary to automatically operate the valve, and close off certain of the lines leading to the brake chambers, is supplied. However, there is also incorporated in the device a time delay action which serves to prevent its operation to close off the supply of air under pressure to the brake operating devices when the pressure differential is due to normal conditions and not to a serious leak. It has been found undesirable to use free closing velocity actuated valves for the purpose since such valves would isolate certain of the brake chambers when no defect actually exists in the system. This is when the air has a relatively long distance to travel in order to reach certain of the brake chambers; the air velocity in the lines for supplying these chambers is necessarily increased during the operation of the brake applying valve.

Also it has been discovered that shock waves which travel at approximately the speed of sound often exist in air brake lines under pressure. Such shock waves will cause air brake devices to function when they are not intended to do so. The construction of the protective unit in accordance with the present invention eliminates this difficulty since the unit is not affected by such shock waves or sudden pressure pulses.

Other objects, features, and advantages of the invention will be apparent from the following detailed description of certain illustrative embodiments of the same taken in conjunction with the accompanying drawings, in which:

Fig. 3 is an end elevational view of the unit shown in Fig. 2;

Fig. 4 is a detail view in cross-section through a valve and spring seat provided in the unit of Fig. 2;

Fig. 5 is a longitudinal sectional view through a modified form of protective unit which may be embodied in the system of the invention; and Fig. 6 is a view of a portion of a further modified form of protective unit which may be embodied in the system.

Figure 1:
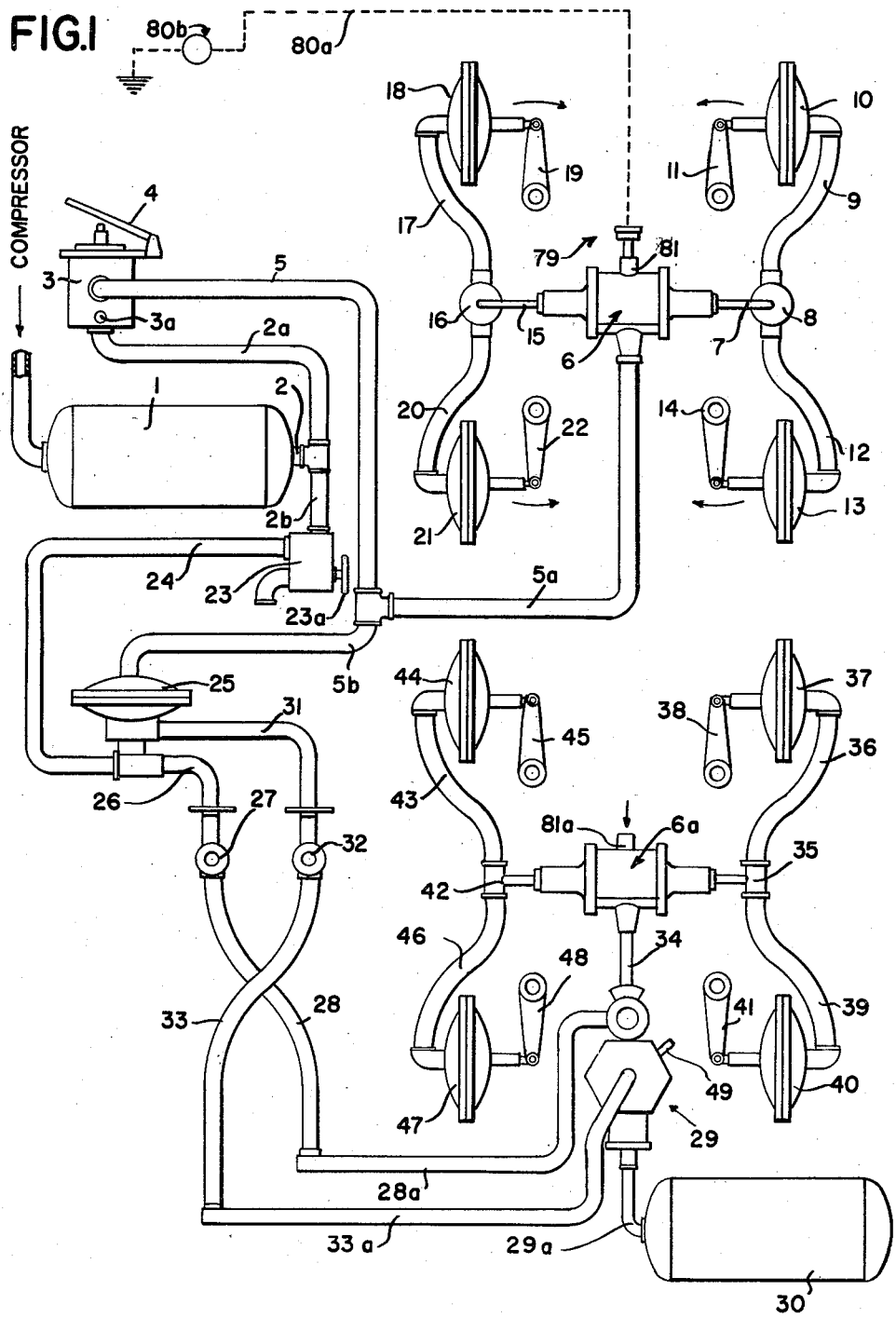
Fig. 1 is a schematic view showing the improved air brake system applied to a tractor-trailer combination.

Referring now to Fig. 1, there is shown an air brake system involving an air reservoir 1 connected with a suitable compressor (not shown) which is arranged to be driven by the prime motive power of the vehicle. The compressor may have a capacity of from 7 to 15 cubic feet displacement and be driven from the engine by suitable connections, under control of a governor, such as Type D manufactured by Bendix-Westinghouse Automotive Air Brake Company, to maintain an air pressure in reservoir 1, under normal conditions, of from 85 to 105 p.s.i. Air is delivered from the reservoir 1 through a pipe 2 and a branch 2a to a valve 3 arranged to be operated by a pedal 4 under the control of the driver. When the pedal is depressed the valve is operated to connect the line 2a with a line 5 which delivers air under pressure to a line 5a that is connected into a protective unit 6 forming an important part of the present invention. From the latter air under pressure is delivered through a line 7 to a quick release valve 8, such as one of the type sold by Bendix-Westinghouse, which is connected by a hose line 9 with a brake chamber 10. The latter has a diaphragm which is flexed in response to the air under pressure to force a piston or plunger outwardly. This plunger is connected with a brake actuating arm 11 which is connected in a conventional manner with the brake shoe or brake band to apply the same to the brake drum connected with one of the wheels of the vehicle. Valve 8 is also connected through a hose line 12 with a brake chamber 13 similarly arranged to operate a brake actuating lever 14. At the opposite side of the unit 6 a pipe 15 delivers air under pressure to a quick release valve 16 which is connected by a hose line 17 with a brake chamber 18 connected with a brake operating lever 19. Valve 16 also delivers the air under pressure through a hose line 20 to a brake chamber 21 arranged to actuate a brake operating lever 22. Thus, whenever the pedal 4 is depressed, air will be delivered under pressure to the four brake chambers 10, 13, 18, and 21 to apply the brakes at four of the wheels of the vehicle. Preferably chambers 10 and 18 are associated with wheels on one side of the vehicle and chambers 13 and 21 with wheels on the opposite side of the vehicle.

When the driver wishes to release the brakes on the truck or tractor or reduce the force applied to the brakes, he will allow the pedal 4 to rise either fully or partially to effect the desired control. If it is permitted to rise fully the pressure in the line 5 is quickly reduced to atmospheric by connecting it within the valve 3 to the exhaust outlet 3a. This will cause quick release valves 8 and 16 to exhaust air from the brake chambers 10, 13, 18, and 21. It will be understood that valves 8 and 16 are provided with exhaust ports for this purpose. If the driver simply eases up on the pressure applied to the pedal 4, he will simply partially vent the line 5 to the atmosphere and maintain a desired pressure within the line 5, 5a. Quick release valves 8 and 16 will, at this time, respond to permit air to be exhausted from the chambers 10, 13, 18, and 21 until the pressure in the latter and the connecting hose lines balances that being maintained within the line 5, 5a and the valves 8 and 16. When a balance is achieved the exhaust ports of the valves 8 and 16 will close.

In the tractor-trailer combination illustrated, air under pressure is also delivered from line 2 through a branch 2b and a valve 23, to a line 24 connected with a diaphragm actuated valve 25. The valve 23 is of conventional construction, such as ES–58 of the Williams Safety System, and is such that when the knob 23a is pulled outwardly, it serves to deliver air under pressure from branch 2b to line 24 and the pressure of the air so delivered serves to hold the valve open so long as a pressure in excess of a predetermined amount, say 50 p.s.i., is maintained in pipe 24. However, when the pressure of the air at the valve 23 drops below such predetermined value, a spring within the valve serves to close the same. Valve 25 may suitably be of the ES–57 type of the Williams Safety System. From the valve 25 the air under pressure is delivered through a line 26 to a coupling 27 connected with a flexible hose 28. The latter, it will be understood, extends between the tractor and trailer of the combination. At the trailer the hose 28 is connected with a pipe 28a which delivers the air under pressure to an emergency relay valve 29 of special but known construction. This may suitably be of the type sold by Bendix-Westinghouse as valve RE–1C. Its construction is such that when air is so delivered under pressure above a diaphragm in the valve 29, a port is opened within the valve to connect line 28a with a line 29a for delivery of the air under pressure to an auxiliary air reservoir 30 carried by the trailer.

Air is supplied from the auxiliary reservoir 30 to the brake operating devices on the trailer whenever the pedal 4 is operated. For this purpose the line 5, upon actuation of the pedal, delivers air under pressure through a branch line 5b to the valve 25. Flexing of the diaphragm in this valve serves to connect the line 24 with a line 31 for delivery of air under pressure to the latter. Line 31 is connected through a coupling 32 with a hose 33 extending from the tractor to the trailer and having its opposite end connected with a pipe 33a on the trailer. The latter delivers air under pressure to the valve 29 and serves to actuate a diaphragm or other pressure responsive device therein which places the reservoir 30 in communication with a protective unit 6a, which is similar to the unit 6, through line 29a, valve 29, and line 34. From unit 6a air under pressure is delivered through a T-fitting 35 to a hose line 36 to a brake chamber 37 for actuating a brake operating lever 38. Air under pressure is also delivered through hose line 39 to a brake chamber 40 for actuating a brake operating lever 41. Similarly at the opposite side of the unit 6a air under pressure is delivered through a T-fitting 42 to a hose line 43 and to a brake chamber 44 for actuating a brake lever 45. Fitting 42 also delivers air under pressure through hose line 46 to a brake chamber 47 for operating the brake actuating lever 48. It will be understood that the levers 38, 41, 45 and 48 are connected with brake shoes or bands arranged to cooperate with brake drums on four wheels of the trailer.

When the driver fully releases the pedal 4 the pressure of the air in line 5b will be reduced to atmospheric by exhausting through the port 3a of valve 3. This will cause the valve 25 to restore to its normal position, in which the supply of air from line 24 is cut off from line 31, hose 33 and line 33a to valve 29. As a result a diaphragm in valve 29 is restored to its normal position and serves to place the chambers 37, 40, 44 and 47 in communication with an exhaust outlet 49 of valve 29. Thus the brake applying force of all of the chambers 37, 40, 44, and 47 will be released. If the driver simply eases up on the pedal 4, and thus reduces the air pressure in line 5 and line 5b, the valve 25 will cause a reduction of the air pressure in line 31, hose 33, and line 33a so that the diaphragm within the valve 29 will be partially restored to its normal position thus bringing about partial release of the air from the chambers 37, 40, 44, and 47 to the atmosphere through exhaust outlet 49, until a balance of pressure is achieved in these chambers with that in the line 33a. Thus so long as the system is intact, and operating properly, the brakes on both the tractor and the trailer are under the full control of the driver through the appropriate operation of the pedal 4.

The system as described above is of conventional character if the special protective units 6 and 6a are considered to be removed and replaced simply by a T-fitting. It will be apparent that in the conventional system if any one of the hose lines 9, 12, 17 or 20 should break or develop a serious leak, or if a serious leak should develop in one of the brake chambers connected therewith, the air under pressure in reservoir 1 would soon be dissipated and could not be replaced fast enough by the compressor so that the brake system would be rendered ineffective. Similarly the reservoir 30 would soon become depleted and the brake system for the trailer rendered ineffective upon the development of a serious leak in any of the hose lines 36, 39, 43 and 46 or upon the breaking of, or development of a serious leak in, any one of the connected brake chambers.

In the conventional brake system applied to tractor-trailer combinations, in which the special protective units 6 and 6a of the present invention are replaced by simple T-fittings, the arrangement is such that if the tractor becomes uncoupled from the trailer and the hose lines 28 and 33 are snapped, the air in the auxiliary reservoir 30 will serve to apply the brakes on the trailer. Under the conditions mentioned the air in hose 28 and pipe 28a would be quickly exhausted to the atmosphere and the valve 29 would cut off communication between the line 28a and auxiliary reservoir 30. Simultaneously a communication is opened up within the valve 29 between the reservoir 30 and the line 34 connected with the four brake chambers 37, 40, 44, and 47. The brakes of the trailer will accordingly be applied. At the same time the hose 33 and line 33a will exhaust to the atmosphere but there will be no loss of air through these connections from the auxiliary reservoir 30, since line 33a simply communicates with one side of a diaphragm within the valve 29. The trailer brakes will remain applied so long as air under pressure is available in reservoir 30 and so long as hose 28 is not supplied with air under pressure. The system of the present invention will function in a similar manner under the emergency conditions described. However, it will be appreciated that in the conventional system if, under the indicated emergency conditions, the air in reservoir 30 is dissipated by a serious leak in any one of the hose lines 36, 39, 43 or 46, all of the brakes on the trailer would be quickly released and a dangerous condition created. This will not be the case in the system of the present invention since, as will be more fully explained hereinafter, a leak in one of the hose lines mentioned will cause the unit 6a to shut off the air delivery port on that side of the unit while air is still being delivered to the brake chambers connected with the opposite side of the unit.

Upon the severing of the hoses 28 and 33, under the conditions assumed above, the loss of air from the main reservoir 1 through the broken ends of these hoses will be quickly cut off by the operation of the valve 23. Thus the air pressure in line 24 will be quickly reduced to atmospheric and the valve 23 will close under spring action so that no air will be delivered to either line 26 or line 31. Air under pressure will still be supplied through line 5b to the valve 25 whenever the pedal 4 is depressed, but this will not cause any appreciable dissipation of the air from the reservoir 1.

Returning now to the improved system of the present invention the protective units 6 and 6a are such that if any one of the hose lines 9, 12, 17, 20, 36, 39, 43 and 46 extending to the various brake chambers described should rupture or develop a serious leak, or if the diaphragm in any one of the brake chambers should break or develop a serious leak, thereby tending to dissipate the air from either the reservoir 1 or the reservoir 30, a part of the braking system will be cut off without affecting the operativeness of remaining portions of the system. Thus if the hose line 9, for example, should break, the unit 6 is such that the delivery of air to the hoses 9 and 12 would be cut off while air under pressure is still available for delivery to the hoses 17 and 20. Similiarly if one of the hoses on the trailer, such as 36, should become severed the unit 6a would shut off the delivery of air from reservoir 30 to hoses 36 and 39 so that the air in reservoir 30 would not be dissipated and it would be available for delivery under pressure through hoses 43 and 46 to apply the brakes identified with those hoses. Preferably, as explained, the arrangement is such that the brakes which are disabled are on opposite sides of the vehicle and similarly the brakes which remain operative are on opposite sides of the vehicle. Thus the rear brakes may be disabled while the front brakes may remain effective.

Figure 2:
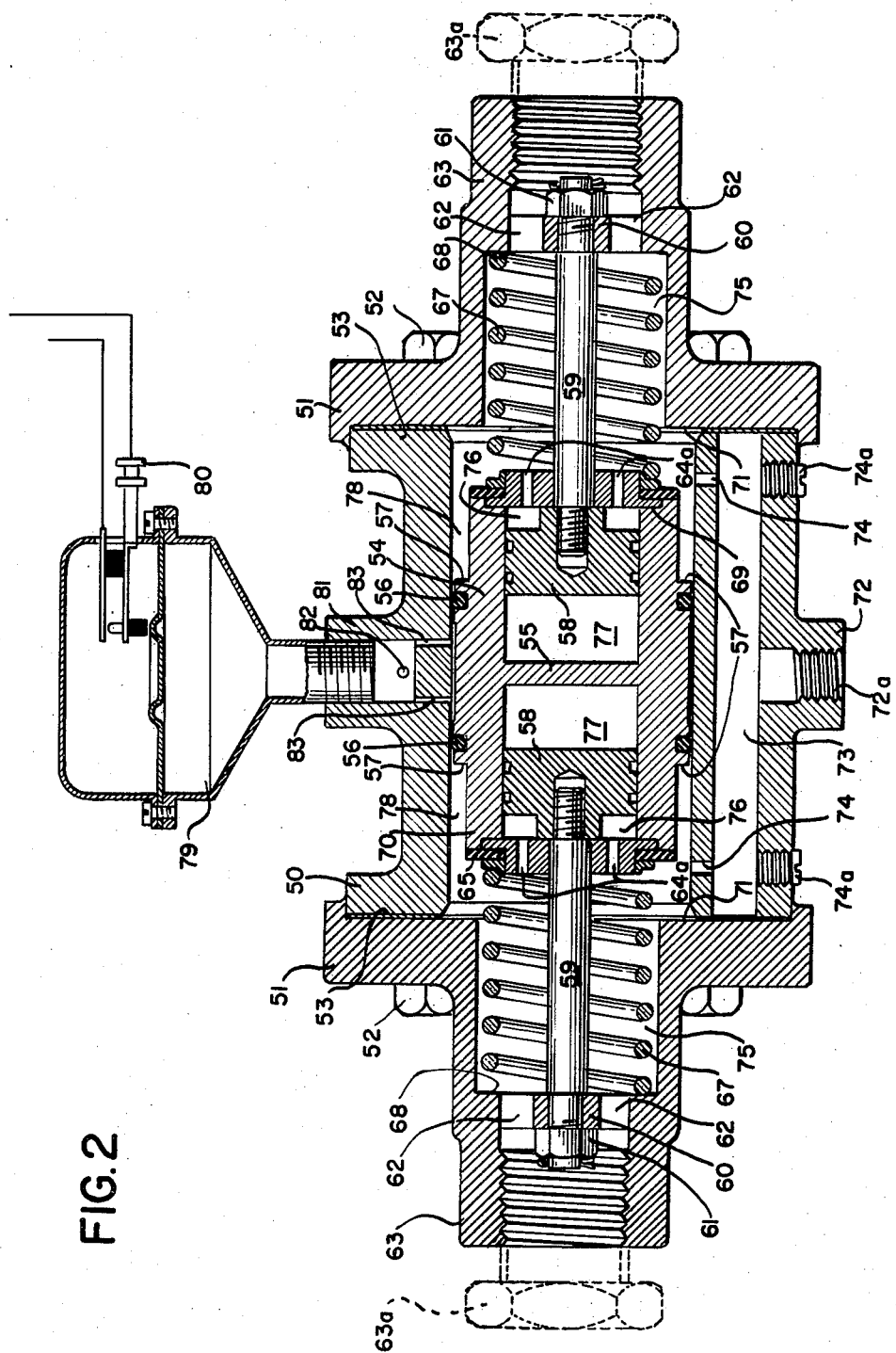
Fig. 2 is a longitudinal sectional view through a protective unit embodied in the system.

Referring now to Figs. 2, 3, and 4, the construction of a preferred embodiment of the protective unit 6 is illustrated. This unit has a housing formed by a main, substantially cylindrical body 50 and a pair of end caps 51. The latter are secured to the main cylindrical body by means of bolts 52 cooperating with radially extending flanges of the main body. A gasket 53 is provided to form an airtight seal between each end cap 51 and the adjacent end of the main body of the housing. Within a cylindrical bore of the main housing there is provided a piston-like element 54 which has a large cylindrical cavity in each end, a partition wall 55 separating the two cavities. O-rings 56, formed of neoprene or the like, are provided in annular recesses extending around the outer face of the piston 54 at points suitably spaced from and on opposite sides of the wall 55. These O-rings serve to provide an effective seal in relation to the wall of the cylindrical bore of the body 50. Piston 54 has its central portion of somewhat larger diameter than the end portions thus providing shoulders 57 beyond the O-rings 56. Within the cavity at each side of the partition wall 55 there is mounted a stationary dummy piston 58 which is held against movement in relation to the main body of the unit. For this purpose a stud 59 has one end in screw threaded engagement with the member 58 and has a reduced portion at its opposite end retained within a central opening in a transverse wall 60 formed within the cap 51. A nut 61 cooperating with threads on the end of the stud 59 serves to retain a shoulder on the latter firmly against the inner surface of the flange 60. The latter has a number of passages 62 therethrough which, as will be explained, serve to permit the free flow of air from within the main body of the housing to and through an extension 63 of the cap which is adapted for connection with one of the pipes 7 and 15 of Fig. 1. For this purpose the extension 63 may be internally screw threaded to receive a coupling element 63a for connecting the pipe with the unit 6. It will be understood that the same construction exists at the two sides or ends of the unit and that one side is connected with pipe 7 and the other with pipe 15.

Slidably mounted on each of the studs 59 is a member 64 (Fig. 4) carrying a valve disc 65 formed of rubber or other flexible material capable of providing a good seal. This valve disc may be retained on member 64 by a washer 66 (Fig. 4). A spring 67 mounted within the cavity of the cap 51 bears at one end against a shoulder 68 of the cap and at its other end against the washer 66 and serves to urge the member 64 against an inset shoulder 69 at the end of piston 54. When the parts are in their normal position, as shown in Fig. 2, the valve disc 65 is held against a smooth shoulder 70 at the end of the piston 54.

The main body 50 of the unit is provided with a downwardly extending boss 72 having a screw threaded opening 72a arranged to retain a fitting for connecting the unit with the end of the pipe 5a (Fig. 1). When air under pressure is delivered to the pipe 5a, upon depressing the pedal 4, the air is passed into a manifold 73 in the body of the unit 6. This manifold communicates through restricted openings 74, one adjacent each end, with the cylindrical bore of the member 50 at the two ends of the piston 54. Drilling of the ports 74 to the desired diameter is made possible by access openings which are then closed off by plugs 74a. Ports 74 are of such cross-sectional area as to permit the air under pressure to flow into the chambers 75 surrounding the springs 67 and from these chambers into the several brake chambers to build up a suitable pressure therein within a short interval of time after the brake applying pedal has been depressed. However, the ports are not so large as to permit the pressure in the line 5a to be completely dissipated in the event that the chamber 75 on one side should suddenly become open to the atmosphere by the rupturing of some part of the connections therefrom to the brake chambers or within the brake chambers themselves.

The air admitted under pressure through the ports 74 into the chambers 75 is permitted to flow freely through passages 64a in the members 64 into annular pockets 76 provided between a reduced portion of each of the dummy pistons 58 and the wall of the corresponding central cavity of the piston 54. Pistons 58 have a sliding fit in relation to the walls of these cavities so that air under pressure may leak slowly around the periphery of each piston 58 from the chamber 76 into a chamber 77 formed between the head of the piston 58 and the adjacent face of the partition 55.

In the normal operation of the unit the pressure acting upon the opposite ends of the piston 54 will be substantially equal and will, therefore, not tend to displace the piston 54 from its central position. If the connections from one of the ends 63 of the unit, for example that at the right end, to the associated brake chambers, should be of substantially greater length than those at the other end, a momentary pressure differential between the two ends of the piston 54 will exist. However, this will not cause a sufficient displacement of the piston 54 to alter the operation of the system. The pressure on the left end of the piston, for example, may be as much as 40 p.s.i. higher than that on the right end for as long as a second and a half without causing sufficient movement of the piston to close off the delivery of air to any of the brake chambers. This is because initial movement of the piston toward the right will serve to compress the air in the righthand chamber 77 and cause expansion of the air in the chamber 77 at the left. Thus a substantial difference in pressure will be created on the two sides of the wall 55 of the piston which will tend to balance partially the greater pressure within the chamber 75 at the left end of the unit as compared with that at the right. Moreover, it will be noted that under the condtiions mentioned the initial movement of piston 54 to the right will remove from it the force of the left spring 67, since this force will then be taken up by the dummy piston 58 on the left side of the unit. On the other hand, the right spring 67 will resist movement of piston 54 by a gradually increasing force. The resulting delaying action on the movement of the piston 54 is sufficient to enable the equalizing of the pressures within the chambers 75 at the two ends of the unit before the piston has moved far enough to close off the chamber 75 on the right. Laboratory tests have shown that a pressure differential of as much as 60 p.s.i. may exist between the two sides of the piston 54 for one and one-half seconds before the piston will move sufficiently to shut off the supply of air to the outlet 63 on the low pressure side of the unit. If a pressure differential of only 20 p.s.i. exists between the two sides of the piston 54, the movement of the latter sufficient to close off the low pressure side of the unit would require about 3 seconds.

Let us assume now that one of the hoses 9 and 12 connected with the right end of the unit is severed during the operation of the pedal 4 to apply the brakes, this will cause the pressure in chamber 75 on that side of the unit to drop quickly to atmospheric. However, the pressure in chamber 75 on the left side of the unit will still be maintained at a substantial value since, as indicated, the ports 74 are of restricted cross-section and will not discharge the air from the manifold 73 as rapidly as it is being continuously supplied thereto from the reservoir 1 when the brake pedal 4 is depressed. The resulting differential in pressure on the two ends of the piston 54 will urge the latter toward the right, but movement of the piston will be retarded not only because of the action of the spring 67 at the right, but also because of the compression of the air within the chamber 77 at the right and the corresponding expansion of the air in the chamber 77 at the left, as the piston shifts toward the right. On the other hand, after several seconds have elapsed a substantial portion of the air within chamber 77 on the right will have leaked around the piston 58 and escaped into the atmosphere so that the piston 54 will, with the indicated delay, be forced to the right until the valve disc 65 is carried into engagement with the smooth shoulder 71 at the right, thus shutting off the discharge of air from the chamber 75 through the outlet 63 at the right. When this condition is reached, air passing through the port 74 at the right will fill the small chamber 78 provided between the reduced portion of valve 54 and the inner wall of the bore of the chamber 50. However, the resulting air pressure will act only upon the annular surface provided by shoulder 57 which, in accordance with the preferred construction of the device, constitutes only about 1/3 of the cross-sectional area of the entire piston. At the left end, on the other hand, the air within the chambers 75 and 78, which will be the same and equal to that in the chamber 78 at the right, will be effective on a much larger cross-sectional area of the piston, in fact its entire cross-sectional area after the air has leaked past the piston 58 to build up the pressure within the chamber 77 at the left. It will be apparent that when a defect occurs which causes the closing off of one side of the unit, the driver will instinctively depress the pedal 4 further to bring about delivery of air under higher pressure to the brake chambers supplied from the still effective side of the unit.

It should be mentioned that in the construction illustrated in Fig. 2, the cross-sectional area of the chamber 77, i.e., the area of the face of the wall 55 of the piston, is 1/3 the entire cross-sectional area of the piston at its point of greatest diameter. Since the area of the annular surface 57 is also 1/3 of the entire cross-sectional area of the piston, this leaves the combined areas of the shoulders 69 and 70 at 1/3 of the entire cross-sectional area. Due to this relationship of the various areas on which the air under pressure is effective when the valve 54 has been shifted toward the right, in the manner explained, to seal off the chamber 75 at the right, the piston will not be restored toward the left until the pressure within the chamber 75 at the left drops to about 10 p.s.i. This is on the basis of a unit in which the piston 54 has a cross-sectional area of 3 square inches and the spring 67, when compressed, exerts a force of 20 pounds. If the springs 67 are stronger and adapted to exert a force of 30 pounds, under the conditions mentioned, the piston will start to return to its central position when the pressure on the left side drops to 15 p.s.i. It will be seen that the manifold 73 will not be placed in communication with the atmosphere through the port 74 on the right side by virtue of the assumed broken hose line 9 or 12, until the brakes controlled by the left end of the unit are substantially released and the supply of air from reservoir 1 is substantially cut-off.

It will be understood that when a break in one of the hose lines occurs in the manner suggested the piston 54 will shift back and forth within the housing upon each application and release of the brakes through the operation of the pedal 4. The delayed movement of the piston in the two directions, as explained above, will be brought about each time. Also it will be understood that if a serious leak should occur in the connections from the left side of the unit to the brake chambers supplied from that side, the closing off movement of the piston 54 will be toward the left.

Means are provided in connection with unit 6 for indicating to the driver that the brakes controlled from one side or the other of the unit are out of operation. Thus there may be mounted on the dash of the tractor any suitable signaling device, such as a red light, which will be flashed whenever the piston 54 of the unit has been shifted sufficiently either toward the right or toward the left to close off one of the ends of the unit. For this purpose there is provided a pressure responsive device 79 having a diaphragm adapted upon movement in one direction, to close a switch connected on one side with one terminal of a battery and connected on its other side through a terminal 80 (Fig. 2) and a wire 80a with one side of a lamp 80b (Fig. 1). The other terminal of the lamp and also the other terminal of the battery may be grounded. Device 79 has a screw-threaded, hollow stem fitted into an internally threaded boss 81 extending upwardly from the body 50 of the housing. Normally the chamber within the device 79 is maintained at atmospheric pressure due to a vent opening 82 through the wall of the boss 81. However, when the piston 54 is shifted toward the right, for example, in the manner explained above, the chambers 75 and 78 on the left which carry air under substantial pressure will be placed in communication with a passage 83 extending from the cylindrical bore of the part 50 into the chamber in the boss 81. It will be understood that the shoulder 57 on piston 54 will, at this time, be carried sufficiently far to the right to place the passage 83 in communication with chamber 78. Port 83 is of sufficiently larger size than vent port 82 to enable pressure to be built up within the device 79 under these conditions and thus operate the signal. If the piston 54 is shifted toward the left to close off the chamber 75 at that side, the right hand port 83 will place the right chamber 78 in communication with the device 79 to operate the signal in the same manner. When the piston 54 is returned to its normal position the ports 83 will be closed off again and the device 79 will be vented to the atmosphere through port 82 and thus open the switch to turn out the light.

A boss 84 extending laterally from the body 50 of the unit is provided for attaching the unit to a suitable part of the frame of the vehicle. If desired a plurality of such bosses may be provided.

The unit 6a forming part of the brake system on the trailer is of the same construction as the unit 6 although, as illustrated in Fig. 1, it is not provided with the pressure responsive switch for signaling the driver that a serious leak has developed in the lines on one side or the other of the unit. The boss 81a, corresponding with the boss 81 of Fig. 2, is simply sealed off by a suitable plug. However, if desired a pressure operated switch similar to that indicated at 79 in Fig. 2 could be provided and connected with a separate lamp or other signal on the dash of the tractor. This, of course, would require disconnectible electrical connections between the trailer and tractor. The operation of unit 6a is the same as described in relation to unit 6, of the air under pressure being delivered to unit 6a, through pipe 34 and the connections already described, from the auxiliary reservoir 30. It will be understood that if the brake chambers connected with one side of unit 6a are closed off by the piston 54, due to a serious leak in the lines supplied by that side of the unit, air from reservoir 30 may still be supplied under pressure to the brake chambers connected with the opposite side of unit, in response to operation of pedal 4 which causes delivery of air under pressure from reservoir 1 to valve 29 for operating the same. Thus half of the brakes on the trailer will remain effective, under the conditions mentioned, and all of the brakes on the tractor will be effective.

In Fig. 5 there is illustrated a modified form of protective unit which may be employed. In the modified unit the housing is formed by two cap members 85 having radially extending flanges 86 in abutting relation and secured together by bolts 87. A diaphragm 88 is interposed between the two housing members and extends completely across the same. It is clamped between the flanges 86 of the housing members in airtight relation thereto. This diaphragm may be formed of any suitable material, such as flexible metal or neoprene or the like, if formed of metal, or other material which is not readily stretchable, it should have a corrugated section in the region just inwardly of the flanges 86 so as to permit substantial lateral movement of the central portion of the diaphragm in the functioning of the device. There is secured to the center of the diaphragm a relatively large, piston-like member 89 formed in two sections, each having outwardly extending flanges 90 which are bolted together and clamped upon the central portion of the diaphragm by means of bolts 91. Piston 89 is provided with a large cylindrical cavity in each end cooperating with and having a sliding fit in relation to a fixed dummy piston 92. Each of these pistons has an elongated stem 93 which projects outwardly through an opening in the end of the associated cap member 85 and is held securely in place in said cap member by a nut 94. An O-ring 95, or other suitable sealing means, is provided to prevent the escape of air around the stem 93.

Slidably mounted on each stem 93 is a disc valve retaining member 96, similar to the member 64 of Figs. 2 and 4. This carries a disc valve 97 and a spring seating element 98a. A spring 98 surrounding each stem 93 within the respective cap member 85 bears at one end against a vertical wall of the cap and at its opposite end against the spring seat 98a. It serves to urge the retaining member 96 against a shoulder 99 provided on the piston 89 and also to hold the disc valve 97 against a shoulder 100 on the piston 89.

The flanges 86 of the housing members are enlarged at a suitable point to provide a threaded opening 101 adapted to receive a suitable fitting for connection of the pipe line 5a of Fig. 1. Through this connection air under pressure may be delivered to a small manifold chamber 102 whenever the pedal 4 is depressed to apply the brakes. From the manifold 102 restricted passages 103 serve to deliver the air to chambers 104 on the opposite sides of the diaphragm 88. These chambers are normally in open communication with chambers 105 surrounding the springs 98. Normally the piston 89 will be retained substantially in its central position, as illustrated, and when air under pressure is delivered to the unit upon depression of the pedal 4 it will pass through the openings 96a, provided through the valve retainers 96, into an annular chamber 106 at one side of the piston 92. Gradually the air will seep around the periphery of this piston into a chamber 107 at the opposite side and in a short interval will create a balanced pressure in all of the chambers mentioned. Air is delivered from the chambers 105 to the brake chambers through threaded openings 108 which are adapted to receive suitable fittings for connecting the pipes 7 and 15 (Fig. 1) to the unit.

The operation of the modified unit is substantially the same as that of the unit illustrated in Fig. 2. If a break should occur in the hose 9, for example, the chambers 104 and 105 at the right side of the diaphragm 88 will be quickly reduced to atmospheric pressure, due to the restricted area of the parts, while the corresponding chambers on the opposite side of the diaphragm will remain under substanital pressure. However, the relationship of the pistons 92 and chambers 106 and 107 is such that a time delay is created in the movement of the piston 89 toward the right. Several seconds will be required to establish a sufficient pressure differential on the two sides of the diaphragm to cause the piston 89 to shift completely toward the right to carry the valve 97 into engagement with the smoothly machined shoulder 109 of the right hand cap member 85 to seal off this side of the unit. This time lag is sufficient to prevent the undesired closing off of either side of the unit due to a momentary pressure differential on the two sides resulting from longer transmission lines to the brake chambers on one side than on the other. When the unit has been closed off in the manner explained, as a result of a serious leak in the lines supplied from one side of the unit, it will remain in that condition until the pressure being maintained on the active side of the unit drops to a predetermined value, say 10 to 15 p.s.i. The forces tending to return it will be supplied by the spring 98 on the side of the unit connected with a defective line and also by the pressure of the air within the chamber 104 on that side. The air in this chamber, however, will exert only about ⅓ the effective force on the diaphragm that is being exerted in the opposite direction by the air under the same pressure in the chambers 104, 105 and 107 on the opposite side of the unit. It will be understood that the proportioning of the various pressure receiving surfaces which tend to apply a shifting force to the piston 89 and diaphragm 88 and the force of the springs 98 of the modified unit are such as to insure the proper functioning of the device under the various conditions explained in relation to Fig. 2.

The switch means for transmitting a signal to the dash board of the tractor is also modified in Fig. 5. It comprises contact elements 110 carried by the piston 89 and adapted upon movement of the latter to be brought into engagement with a contact element 111 at one side or the other of the diaphragm, depending upon the direction of movement of the piston. Contact 111 is carried by a threaded post which extends upwardly through an insulator 112 and carries nuts 113 at its upper end to clamp the end of a wire. This wire extends to the lamp or other signal means, the opposite side of which is connected with one terminal of the battery or other power source; the opposite terminal of the battery is grounded and thus connected with the contacts 110 which are also grounded.

One objection to the modified form of the protective unit shown in Fig. 5 is that if the diaphragm 88 should rupture the device would not function properly to cut off the brake chambers at one side or the other of the unit under the conditions mentioned. In the embodiment illustrated in Fig. 2 the seals 56 may become worn in the course of use and the proper operation of the device thus interfered with. However, if this occurs the air under pressure on the side of the unit having the worn sealing element will leak past the latter to the port 83 and thus bring about operation of the switch 79 to flash a signal to the driver. The unit may then be readily repaired.

Referring now to Fig. 6, there are illustrated various modifications of the unit shown in Fig. 2. The housing may be of the same construction as in Fig. 2 and it embodies a substantially cylindrical body portion 114 with cap elements 115 applied to its opposite ends. Within the cylindrical bore of the member 114 is mounted a piston 116 which is generally similar in construction to the piston 54. However, in lieu of the O-ring sealing elements 56 of the earlier embodiment there is provided sealing members 117 of generally U-shaped cross-section. These sealing elements may suitably be formed of neoprene and retained in any convenient way around the circumference of somewhat reduced portions of the piston 116. The cylindrical bores within the piston 116 are larger in diameter than in the piston 54 of Fig. 2. The relationship is such that the wall 116a has an area which is substantially one-half of the cross-sectional area of the piston 116 in its region of maximum diameter. This relationship has been found particularly desirable in systems having substantially longer conduits connected with one side of the unit than the other extending to the brake chambers. It will be appreciated that with the larger area of the wall 116a a longer time delay will be provided for the development of the necessary pressure differentials on the two sides of the piston to cause the latter to shift completely to one side or the other to seal off the corresponding side of the unit. This is because the chambers 77 (Fig. 2) in cooperation with larger dummy pistons 58, will serve to retard the movement of the piston toward the low pressure side of the unit for a longer period, due to the longer time required to reduce the pressure in the chamber 77 on the low pressure side to the necessary extent. It has been found that when the area of the wall 116a is one-half that of the cross-sectional area of the piston at its major diameter, a time delay of 2 to 3 seconds is provided before the defective side is shut off with a pressure differential of 30 p.s.i. between the two sides of the piston.

In Fig. 6 there is also illustrated a different arrangement for sealing off one side or the other of the unit when a defect occurs in the lines for delivering air under pressure to the brake chambers on the corresponding side of the unit. In lieu of the valve disc 65 of the earlier embodiment there is provided an O-ring 118 in the inner face of the cap 115 which is arranged to be engaged by a shoulder 119 on the piston 116. When this shoulder is forced against the sealing ring 118 by the movement of the piston 116, the corresponding side of the unit will be closed off in the same manner as has been explained. It will be understood that except for the modifications discussed above the unit of Fig. 6 may be the same as that shown in Fig. 2.

In all of the embodiments the springs, which serve to hold the piston members in their central position and to restore them to this position when they have been shifted to one side or the other, should be of appropriate compressive force depending upon the size of various air ports and air pressure receiving surfaces provided in the system. If a relatively light spring is employed it is possible to make the air delivery ports 74 (Fig. 2) of somewhat larger cross-sectional area so that the operation of the brakes may be speeded up and yet allow for a sufficient pressure differential to be created between the two sides of the piston to force the later toward the defective side should a serious leak develop. It has been found that with springs having a force of 30 pounds when compressed to the extent required to seal off one side of the unit, the ports 74 may be of $3/16''$ diameter. If the piston has an overall cross-sectional area of 3 square inches, a pressure differential of 10 p.s.i. between the two sides of the piston will then cause it to shift completely to one side to close off that side which has developed a defect. When the piston has closed off the defective side, pressure will be quickly built up in the chamber 78 on that side but this will exert its force on only 1/3 of the area of the piston. Moreover, the pressure on the open side of the piston will build up quickly when the escape of air from the manifold to the atmosphere is cut off. So long as a pressure differential of 1.5 p.s.i. exists between the two sides of the piston it will be retained in its closing off position. An advantage of this lower spring force is that it permits the active brake chambers to be exhausted to a lower pressure before the piston 54 starts to return toward its central position and thus opens up the communication between the manifold 73 and the chamber 75 on the side of the system which has developed a defect.

While various embodiments of the protective unit incorporated in the improved system of the present invention have been shown and described in detail, and various modifications have been suggested, it should be understood that various modifications may be made in the construction and arrangement of the various parts. Also, while the invention has been described particularly in relation to its application to an air brake system, its principles and special features are capable of adaptation to systems of other types involving fluid pressure actuated devices.

What is claimed is:

1. In a brake system for a vehicle having wheels with fluid operated brake means associated therewith and conduits for delivering fluid under pressure from a source to said brake means, the combination of cut-off means in said conduits providing a part of the path for the fluid flowing to said brake means, said cut-off means comprising a housing having a fluid inlet and a plurality of fluid outlets, a member normally retained centrally within said housing between said outlets and enabling fluid to pass from said inlet to each of said outlets, said member having a cylinder bore in each end thereof, a dummy piston mounted within each of said bores and each held stationary by connections from said housing, said pistons and said cylinder bores defining fluid retaining chambers at opposite sides of said member, said member being arranged to shift toward one end or the other of said housing in response to a difference in the fluid pressure established at the opposite ends of said member, said fluid chambers serving to retard said movement, said pistons enabling the slow passage of fluid from one side to the other thereof and thus enabling continued movement of said member toward one end of the housing when the fluid pressures at the opposite ends of said member continues to be substantially different, and sealing means at each end of said member for closing the adjacent outlet after said member has shifted a predetermined distance from its normal position.

2. In a brake system of the character set forth in claim 1, said housing having a cylinder bore, said member being a piston slidable within said bore and in turn having a smaller bore in each end thereof to receive said dummy pistons, and said member having a wall therein serving to close off the inner ends of said smaller bores.

3. In a brake system of the character set forth in claim 1, said housing having a diaphragm centrally disposed between the ends thereof and arranged to divide the interior of said housing into two non-communicating compartments, said member comprising a pair of cylinders secured to said diaphragm centrally thereof and spaced substantially from the inner wall of said housing, each of said dummy pistons cooperating with one of said cylinders.

4. In a brake system of the character set forth in claim 1, mechanical means for yieldingly biasing said member into a central position within said housing, the arrangement being such that said fluid retaining chambers are normally of equal capacity.

5. In a brake system of the character set forth in claim 1, said dummy pistons having a cross-sectional area approximately one-half the cross-sectional area of the interior of said housing.

6. In a brake system of the character set forth in claim 2, said dummy pistons having a cross-sectional area of between about ⅓ and ½ the major cross-sectional area of said member.

7. In a brake system of the character set forth in claim 6, spring means coacting between each end of said member and an opposed surface on the housing to bias said member into a central position within the housing.

8. In a brake system of the character set forth in claim 7, said spring means at each end of said member being adapted to develop a suitable restoring force upon movement of said member in the direction of said spring means to an extent sufficient to close off the corresponding outlet.

9. In a brake system of the character set forth in claim 1, said fluid retaining chambers being out of communication with each other but having a restricted communication with the opposite sides of their respective dummy pistons, said opposite side of each dummy piston being in communication with the source of fluid supply except when said member has been shifted to its cut-off position in relation to the supply of fluid to the adjacent outlet.

10. In a brake system of the character set forth in claim 2, said piston member having a plurality of sealing means at opposite sides of a median transverse plane through said member, said sealing means cooperating with the inner wall of said housing, at least one auxiliary fluid outlet from said housing in the region of said sealing means enabling the discharge of fluid from said housing upon movement of said piston member into cut-off position in relation to one of said first-mentioned outlets, whereby an auxiliary device related to said system may be operated by the fluid discharged through said auxiliary outlet.

11. In a brake system of the character set forth in claim 10, a conduit for transmitting fluid from said auxiliary outlet to said auxiliary device, and a restricted discharge passage from said last-mentioned conduit.

12. In a brake system of the character set forth in claim 3, said cylinders and dummy pistons providing a chamber within each of said cylinders at their respective sides of said diaphragm, and a restricted passage provided in relation to each of said dummy pistons for enabling the retarded flow of the fluid from one side to the other of said dummy pistons.

13. In a brake system of the character set forth in claim 12, the cross-sectional area of said pistons being between about ⅓ and ½ of the transverse cross-sectional area of the interior of said housing.

14. In a brake system of the character set forth in claim 1, said housing comprising a pair of hollow caps closing the ends thereof, said connections from said housing for holding said dummy pistons stationary comprising piston rods secured to said caps and to said dummy pistons, said sealing means comprising a sliding seal on each of said piston rods, spring means for urging said seals and said member into a central position in relation to said dummy pistons, each of said seals being arranged to close off the outlet at the respective end of said housing when said member is shifted to its extreme position in one direction, the movement of each seal in the opposite direction being limited by cooperation with its related dummy piston.

References Cited in the file of this patent

UNITED STATES PATENTS

| | | |
|---|---|---|
| 870,806 | Turner | Nov. 12, 1907 |
| 1,588,657 | Christensen | June 15, 1926 |
| 1,609,641 | Christensen | Dec. 7, 1926 |
| 1,831,081 | Smith | Nov. 10, 1931 |
| 2,024,343 | Eaton | Dec. 17, 1935 |
| 2,053,461 | Campbell | Sept. 8, 1936 |
| 2,246,621 | Davis | June 24, 1941 |
| 2,411,406 | Affleck | Nov. 19, 1946 |
| 2,539,829 | Gomer | Jan. 30, 1951 |
| 2,570,874 | Shumaker | Oct. 9, 1951 |
| 2,723,164 | Burdick | Nov. 8, 1955 |
| 2,279,226 | Jones | Jan. 3, 1956 |
| 2,764,176 | Darquier | Sept. 25, 1956 |
| 2,792,916 | Williams | May 21, 1957 |